United States Patent
Holla et al.

(10) Patent No.: US 12,349,233 B2
(45) Date of Patent: Jul. 1, 2025

(54) METHOD TO MANAGE WIRELESS DEVICE PROFILES

(71) Applicant: Google LLC, Mountain View, CA (US)

(72) Inventors: Pavan Kumar Vakwadi Holla, Mountain View, CA (US); Yaniv Tzoreff, Sunnyvale, CA (US); Ibrahim Mohamed Ferouz, Sunnyvale, CA (US); Kyle Kiyoshi Horimoto, Culver City, CA (US)

(73) Assignee: GOOGLE LLC, Mountain View, CA (US)

( * ) Notice: Subject to any disclaimer, the term of this patent is extended or adjusted under 35 U.S.C. 154(b) by 305 days.

(21) Appl. No.: 17/879,376

(22) Filed: Aug. 2, 2022

(65) Prior Publication Data
US 2024/0048962 A1    Feb. 8, 2024

(51) Int. Cl.
*H04W 48/16*    (2009.01)
*H04W 8/18*    (2009.01)
*H04W 8/20*    (2009.01)

(52) U.S. Cl.
CPC ........... *H04W 8/205* (2013.01); *H04W 8/183* (2013.01); *H04W 48/16* (2013.01)

(58) Field of Classification Search
CPC ....... H04W 8/183; H04W 8/186; H04W 8/20; H04W 8/205; H04W 8/22; H04W 8/24; H04W 8/265; H04W 48/16
See application file for complete search history.

(56) References Cited

U.S. PATENT DOCUMENTS

| | | | |
|---|---|---|---|
| 9,674,880 B1 * | 6/2017 | Egner | A61B 5/14542 |
| 10,966,080 B1 * | 3/2021 | Chen | H04W 8/183 |
| 11,051,305 B1 * | 6/2021 | Che | H04W 72/0453 |
| 11,310,654 B1 * | 4/2022 | Indurkar | H04W 8/205 |

(Continued)

FOREIGN PATENT DOCUMENTS

WO    2020205011 A1    10/2020

OTHER PUBLICATIONS

International Search Report and Written Opinion for corresponding Application No. PCT/US2023/027624 dated Nov. 1, 2023 (14 pages).

*Primary Examiner* — Jean A Gelin
(74) *Attorney, Agent, or Firm* — Botos Churchill IP Law LLP

(57) ABSTRACT

The technology searches for and activates an eSIM profile on a wireless communication device. One or more processors of the wireless communication device identify a geographic location associated with the device and at least one carrier that provides a wireless network communication service to the geographic location of the device. The device sends an inquiry to at least one subscription server associated with the at least carrier to determine if the at least one subscription server stores an electronic identity module (eSIM) profile associated with a unique identifier of the device. The inquiry includes the unique identifier of the device. The device receives a response from the at least one subscription server indicating that the at least one subscription server stores the eSIM profile associated with the unique identifier of the device. The device displays a prompt to a user indicating that the eSIM profile stored on the at least one subscription server is available for download.

22 Claims, 9 Drawing Sheets

(56) References Cited

U.S. PATENT DOCUMENTS

| | | | | |
|---|---|---|---|---|
| 2007/0167173 | A1* | 7/2007 | Halcrow | H04W 4/02 |
| | | | | 455/456.2 |
| 2011/0300837 | A1* | 12/2011 | Misiag | H04W 4/18 |
| | | | | 455/414.2 |
| 2011/0306318 | A1 | 12/2011 | Rodgers et al. | |
| 2012/0331292 | A1* | 12/2012 | Haggerty | H04W 88/06 |
| | | | | 713/168 |
| 2013/0210388 | A1* | 8/2013 | Li | H04W 28/04 |
| | | | | 455/411 |
| 2016/0246661 | A1* | 8/2016 | Höfig | G06F 11/008 |
| 2017/0244837 | A1* | 8/2017 | Kim | H04M 1/72409 |
| 2018/0069581 | A1 | 3/2018 | Narasimhan et al. | |
| 2020/0264857 | A1 | 8/2020 | Koo et al. | |
| 2020/0296574 | A1 | 9/2020 | Baek et al. | |
| 2021/0306830 | A1* | 9/2021 | Williams | H04W 8/205 |
| 2022/0232366 | A1* | 7/2022 | Seo | H04W 8/18 |
| 2022/0232388 | A1* | 7/2022 | Seo | H04W 12/42 |
| 2022/0279390 | A1* | 9/2022 | Zhang | H04W 36/322 |
| 2022/0345877 | A1* | 10/2022 | Jung | H04W 8/183 |
| 2022/0369064 | A1* | 11/2022 | Lomnitz | H04W 52/0225 |
| 2023/0064618 | A1* | 3/2023 | Pang | H04W 52/028 |
| 2024/0007848 | A1* | 1/2024 | Chaugule | H04W 60/04 |
| 2024/0224021 | A1* | 7/2024 | An | H04W 8/205 |
| 2024/0267722 | A1* | 8/2024 | Padova | H04W 8/205 |

* cited by examiner

700

| SM-DP+ ADDRESS: |
| wbg.prod.ondemandconnectivity.com |

| Matching ID: |
| GS05VONDCDMZKAOG |

SM-DP+ ADDRESS & Matching ID:  — 706

LPA:1$wbg.prod.ondemandconnectivity.com$GS05VONDCDMZKAOG

FIG. 7

METHOD TO MANAGE WIRELESS DEVICE PROFILES

BACKGROUND

A subscriber identity module (SIM) card is a carrier-specific, portable memory chip that connects a user device to a carrier's wireless network. An embedded SIM (eSIM) accomplishes the same without the need of a physical SIM card contained within the user device. Typically, user device operating systems support eSIM, such as via a native eSIM application. To connect to a carrier's network via eSIM, an eSIM profile offered by the carrier needs to be installed on the user device. The eSIM profile is a virtual profile that stores the user's subscription and network settings. This allows a user to have multiple profiles associated with a single user device, thereby enabling the device to operate on multiple wireless networks which may be located in different geographic regions.

After the eSIM profile is obtained from the carrier, the carrier may report eSIM profile information to a discovery server maintained by a central service such as the Global System for Mobile Communications Association (CSMA). The discovery server can provide a Subscription Manager Discovery Server (SMDS), and can host records indicating if any carrier has an eSIM profile in its subscription manager-data preparation (SM-DP+) server for a given user device. The SM-DP+ server may also be referred to as a subscription server.

To obtain the eSIM profile, the user device may query the discovery server (e.g., SMDS) to determine which SM-DP+ server, if any, stores its eSIM profile. However, many carriers may not report eSIM profile information to the discovery server. In such cases, the user device would not be able to rely on the discovery server (e.g., SMDS) to find out which SM-DP+ server stores its eSIM profile. As a result, to download the eSIM profile, the user may need to manually identify on the user device the SM-DP+ server that stores its eSIM profile. This can be time consuming and result in errors or other issues when managing profiles on the user device.

In some situations, the user can purchase an eSIM profile via a carrier website or a physical store. Then the user can open the eSIM application on the user device and manually enter the carrier's SM-DP+ server address. For example, to enter the carrier's SM-DP+ server address, the user may manually scan a quick response (QR) code issued by the carrier which encodes the activation code (e.g., including an SM-DP+ server address and other optional fields). Some operating systems may be able to automatically use the activation/QR code without manual scanning, provided that the carrier implements an operating system-specific protocol. Different operating systems may require carriers to implement different protocols, which can reduce the likelihood that the carriers implement them at all.

BRIEF SUMMARY

The technology provides an operating system-agnostic solution to activate an eSIM profile on a wireless user device, which eliminates requiring that carriers implement different protocol requirements for different operating systems. The approach described herein provides an automated solution to search for and activate an eSIM profile on the user device, which reduces the amount of user-device interaction and associated processing required to install and/or activate an eSIM profile. For instance, user-device interactions for launching an eSIM application, scanning the QR code or entering the activation code may be avoided. From a technical standpoint, this is able to streamline the provisioning process from the perspectives of both the user device and the carrier. Aspects of the disclosure provide technical solutions to the technical problems present in eSIM profile activation, including automatically identifying whether specific carriers support eSIM profiles for the user's device, and minimizing errors in the provisioning process. As noted above, the technical solutions also minimize the amount of user-device interaction and associated, processing by the device.

In a first aspect, a method is provided. The method comprises: identifying, by one or more processors of a wireless communication device, a geographic location associated with the device; identifying, by the one or more processors, at least one carrier that provides a wireless network communication service to the geographic location of the device; sending an inquiry to at least one subscription server associated with the at least carrier to determine if the at least one subscription server stores an eSIM profile associated with a unique identifier of the device, the inquiry including the unique identifier of the device; receiving a response from the at least one subscription server indicating that the at least one subscription server stores the eSIM profile associated with the unique identifier of the device; and generating for display, on a graphical user interface associated with the device, a prompt to a user indicating that the eSIM profile stored on the at least one subscription server is available for download.

In an aspect combinable with the first aspect, the method may further comprise sending a request to the at least one subscription server to download the eSIM profile; and receiving the eSIM profile from the at least one subscription server for installation on the device.

In an aspect combinable with any one of the previous aspects, the method may further comprise installing the eSIM profile into an embedded universal integrated circuit card of the device.

In an aspect combinable with any one of the previous aspects, the unique identifier of the device may include at least one of an embedded universal integrated circuit card identifier or an international mobile equipment identity.

In an aspect combinable with any one of the previous aspects, the method may further comprise: storing a list of known carriers along with geographic information of their network communication services and their subscription server addresses; identifying, by the one or more processors, a plurality of carriers in the list that provide a network communication service to the geographic location of the device; and identifying a plurality of subscription servers associated with the plurality of carriers that provide the network communication service to the geographic location of the device.

In an aspect combinable with any one of the previous aspects, the method may further comprise: sending a first inquiry to a discovery server to search for any eSIM profile associated with the unique identifier of the device, the discovery server configured to provide a switched multi-megabit data service; and receiving, from the discovery server, a response to the first inquiry identifying at least one subscription server storing an eSIM profile associated with the unique identifier of the device.

In an aspect combinable with any one of the previous aspects, the method may further comprise: determining that the at least one subscription server identified by the discovery server is among the plurality of subscription servers associated with the plurality of carriers; sending a second inquiry to each remaining subscription server of the plurality of subscription servers to determine if each of them stores any eSIM profile associated with the unique identifier of the device; receiving a response to the second inquiry from at least one remaining subscription server of the plurality of subscription servers indicating that it stores an eSIM profile associated with the unique identifier of the device; and generating for display, on the graphical user interface, a prompt to the user indicating available eSIM profiles for download. The available eSIM profiles may include: the eSIM profile stored on the at least one subscription server identified by the discovery server indicated in the response to the first inquiry, and the eSIM profile stored on the at least one remaining subscription server indicated in the response to the second inquiry.

In an aspect combinable with any one of the previous aspects, the method may further comprise: sending a second inquiry to each of the plurality of subscription servers associated with the plurality of carriers to determine if each of them stores any eSIM profile associated with the unique identifier of the device; receiving a response to the second inquiry from at least one subscription server of the plurality of subscription servers indicating that it stores an eSIM profile associated with the unique identifier of the device; determining whether any eSIM profile indicated in the response to the second inquiry duplicates any eSIM profile indicated in the response to the first inquiry; and generating for display, on the graphical user interface, a prompt to the user indicating available eSIM profiles for download without duplicates.

In an aspect combinable with any one of the previous aspects, the method may further comprise: sending an inquiry to each of the plurality of subscription servers associated with the plurality of carriers to determine if each of them stores any eSIM profile associated with the unique identifier of the device; receiving a response from at least one subscription server of the plurality of subscription servers indicating that it stores an eSIM profile associated with the unique identifier of the device; and generating for display, on the graphical user interface, a prompt to the user indicating that the eSIM profile stored on the at least one subscription server is available for download.

In an aspect combinable with any one of the previous aspects, the method may further comprise: receiving responses from at least two subscription servers of the plurality of subscription servers indicating that each of them stores an eSIM profile associated with the unique identifier of the device; and generating for display, on the graphical user interface, a prompt to the user indicating available eSIM profiles for download, the available eSIM profiles including the eSIM profiles stored on the at least two subscription servers.

In an aspect combinable with any one of the previous aspects, the method may further comprise: receiving a selection of at least one eSIM profile from the available eSIM profiles for download; sending a request, to at least one subscription server associated with the selected at least one available eSIM profile to download the selected at least one eSIM profile; and receiving the selected at least one eSIM profile for installation on the device.

In an aspect combinable with any one of the previous aspects, the method may further comprise: detecting, by the one or more processors, an event that triggers a search for the eSIM profile. The event may include: an event indicating that the user has actually purchased the eSIM profile; an event indicating that the user has likely purchased the eSIM profile; or an event indicating that the device powers on.

In another aspect, a system is provided. The system comprises: memory configured to store a plurality of subscription server addresses associated with a plurality of carriers that provide wireless network communication services to a plurality of geographic locations; and one or more processors. The one or more processors may be configured to: identify a geographic location associated with the device; identify at least one carrier that provides a network communication service to the geographic location of the device; send an inquiry to at least one subscription server associated with the at least one carrier to determine if the at least one subscription server stores an eSIM profile associated with a unique identifier of the device, the inquiry including the unique identifier of the device; receive a response from the at least one subscription server indicating that the at least one subscription server stores the eSIM profile associated with the unique identifier of the device; and generate for display, on a graphical user interface, a prompt to a user indicating that the eSIM profile stored on the at least one subscription server is available for download.

In yet another aspect, a method for detecting activation information of an eSIM profile is provided. The method comprises: detecting, by one or more processors of a wireless computing device, a webpage including data of a predefined pattern, the predefined pattern being associated with an activation code string of an eSIM profile provided by a subscription server; changing, by the one or more processors, a display format of the detected data on the webpage to a selectable link; and launching, by the one or more processors, an eSIM application to download the eSIM profile from the subscription server after detecting selection of the selectable link.

In an aspect combinable with the previous aspect, the data of the predefined pattern may include a string of the predefined pattern or a quick response code encoding information of the predefined pattern. The predefined pattern may include one or more of the following: a predefined set of leading characters, a subscription server address, a matching identifier, one or more delimiters, an object identifier of a subscription server, or a confirmation code required flag.

In an additional aspect, a method for detecting activation information of an eSIM profile is provided. The method may comprise: detecting, by one or more processors of a wireless computing device, a webpage including data of a predefined pattern, the predefined pattern indicating activation of an eSIM profile provided by a subscription server. The detected data may be associated with an activation code string for retrieving information of the eSIM profile from the subscription server. The method may further comprise: identifying the activation code string from the detected data; sending an inquiry to the subscription server to retrieve information of the eSIM profile using the identified activation code string; and generating for display, on a graphical user interface associated with the wireless computing device, a prompt to the user requesting consent from the user to download the eSIM profile. The prompt may display the retrieved information of the eSIM profile.

In an aspect combinable with the previous aspect, the data of the predefined pattern may include a string of the predefined pattern or a quick response code encoding information of the predefined pattern. The predefined pattern may include one or more of the following: a predefined set of leading characters, a subscription server address, a matching identifier, one or more delimiters, an object identifier of a subscription server, or a confirmation code required flag.

In a further aspect, a processing system for detecting activation information of an eSIM profile is provided. The processing system may comprise one or more processors configured to: detect a webpage includes data of a predefined pattern, the predefined pattern indicating activation of an eSIM profile provided by a subscription server; change a display format of the detected data on the webpage to a selectable link; and launch an eSIM application to download the eSIM profile from the subscription server after detecting a selection by a user of the selectable link.

In another aspect, a processing system for detecting activation information of an eSIM profile is provided. The processing system may comprise one or more processors configured to: detect a webpage includes data of a predefined pattern, the predefined pattern, indicating activation of an eSIM profile provided by a subscription server, the detected data being associated with an activation code string for retrieving information of the eSIM profile from the subscription server; identify the activation code string from the detected data; send an inquiry to the subscription server to retrieve information of the eSIM profile using the identified activation code string; and generate for display, on a graphical user interface, a prompt to the user requesting consent from the user to download the eSIM profile. The prompt may display the retrieved information of the eSIM profile.

BRIEF DESCRIPTION OF THE DRAWINGS

FIG. 7 is another schematic illustration of a carrier's webpage showing information to activate an eSIM profile in accordance with aspects of the disclosure.

DETAILED DESCRIPTION

The technology provides a streamlined provisioning approach for obtaining and activating an eSIM profile on a wireless user device. This approach is able to eliminate complicated provisioning flows in the device's user interface, which can include automated eSIM profile polling and discovery. One aspect of the technology enables a wireless device to automatically scan a plurality of subscription servers of different carriers to search for an eSIM profile, and prompt the user to download the eSIM profile once found. A second aspect of the technology enables the wireless device to automatically detect a webpage including a predefined pattern that indicates activation of an eSIM profile, and presents a selectable link that upon selection automatically launches an eSIM application to download the eSIM profile. Another aspect of the technology automatically prompts the user to download the eSIM profile after detecting such a webpage.

The technical solutions disclosed herein have many technical advantages. The overall approach provides a technical benefit of avoiding provisioning bottlenecks, both at the user device and on the network side. The technical solution can simplify both the eSIM profile installation and the activation process, reducing the amount of user-dev ice interaction required to install and/or activate an eSIM profile. For instance, user-device interaction relating to launching the eSIM application on the device, copying and pasting an activation code string or scanning a QR code into the eSIM application may be avoided. In addition, the technical solutions are operating system agnostic. This can eliminate the need for carriers to implement protocols that are operating system dependent, which could otherwise necessitate carriers having to provide numerous specific and potentially incompatible protocols. Further, the technical solutions readily adapt to existing infrastructures of carrier web portals and/or SM-DP+ servers operated by carriers.

The present technology will now be described with respect to the following exemplary systems and methods.

1. Overview

Figure 1:
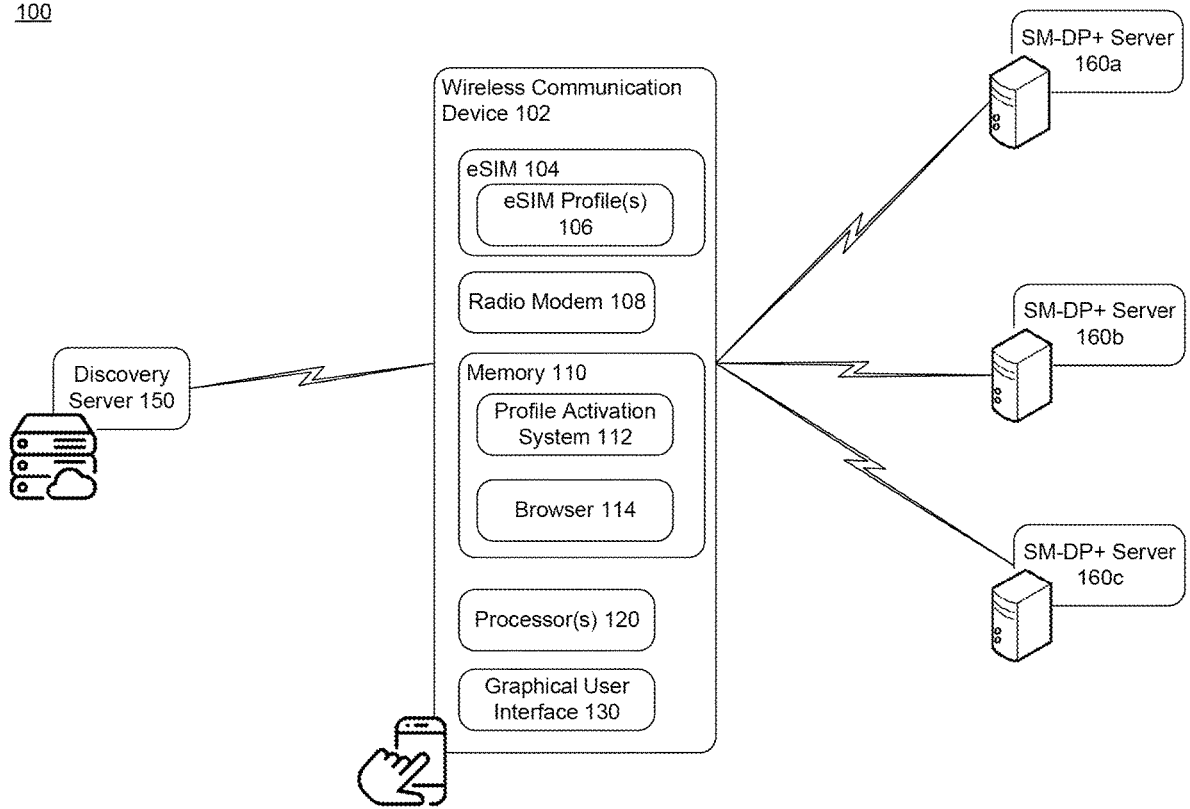
FIG. 1 illustrates an example wireless communication environment in accordance with various aspects of the present disclosure.

FIG. 1 illustrates an example wireless communication environment 100 that supports eSIM profile activation in accordance with aspects of the present disclosure. The environment 100 may include a user device such as a wireless communication device 102. The device 102 may include an eSIM card 104, which may be referred to herein as eSIM 104. The eSIM 104 may be implemented as an embedded universal integrated circuit card (eUICC) that allows the device 102 to access a wireless network. The eSIM 104 may store one or more eSIM profiles 106 to enable the device 102 to receive wireless communication services provided by different carriers. Each eSIM profile 106 may store a user's subscription to a carrier's wireless communication service and may also store a phone number assigned to the device 102 by the carrier. Further, the eSIM profile 106 may store the carrier's network settings, including but not limited to network access keys and/or network access credentials for one or more of 5G, long term evolution (LTE), code division multiple access (CDMA), and global system for mobile communications (GSM) telecommunication protocols. Other network arrangements may also be utilized. The technology herein is not limited to any particular network type.

Different eSIM profiles 106 may have different file sizes. For instance, one eSIM profile may be twice as large as another eSIM profile. In one example, depending on the eSIM memory space, the device 102 may store up to six eSIM profiles 106. In other examples, even more eSIM profiles 106 may be stored. The eSIM profile 106 may be purchased from the carrier through a sideband channel, such as the carrier's website or a physical store. At the time of purchase, a carrier, such as a mobile network operator (MNO), may require the user to provide a device identifier (ID) that uniquely identifies the device 102, so that the carrier's SM-DP+ server may associate the purchased eSIM profile 106 with the device ID. The device ID may include one or more of the following: an embedded universal integrated circuit, card (eUICC) identifier and an international mobile equipment identity (IMEI), and any other unique device identifier. The eUICC identifier may identify the eSIM card 104 of device 102. To download the eSIM profile from the carrier's SM-DP+ server, the device 102 may send the device ID to the SM-DP+ server so as to locate the eSIM profile associated with the device ID. Once the eSIM profile 106 is downloaded onto the device 102, the device 102 may start to use the wireless communication service provided by the carrier. In particular, a radio modem 108 of the device 102 may read the network access credentials stored in the eSIM profile 106 and establish a wireless connection with the carrier's cell site by using the network access credentials.

As shown in FIG. 1, the device 102 may be configured to communicate wirelessly with a discovery server 150. The discovery server 150 may store information indicating if any carrier has an eSIM profile in its SM-DP+ server for a given user device. The device 102 may query the discovery server 150 to determine if any SM-DP+ server has an eSIM profile associated with the device 102. The discovery server 150 may determine if there is any eSIM profile associated with the device ID of the device 102. The discovery server 150 may return addresses of all SM-DP+ servers, if any, that have eSIM profiles associated with the device ID. The device 102 may contact each SM-DP+ server identified by the discovery server, or a subset of such SM-DP+ servers, to download the associated eSIM profiles. However, as explained above, not all carriers may report to the discovery server 150 eSIM profile purchase information. As a result, the discovery server 150 may not, have any record regarding which SM-DP+ server has an eSIM profile associated with the device 102. In this case, when inquired by the device 102, the discovery server 150 may return no finding to the device 102.

As illustrated in FIG. the device 102 may have a profile activation system 112 in its memory 110, executable by one or more processors 120. The system 112 may be configured to search for an eSIM profile associated with the device ID. The system 112 may store a list of known carriers (e.g., a complete list of all known carriers), along with their service geographic information and their SM-DP+ server addresses. This list may include SM-DP+ servers, such as 160a, 160b, and 160c, associated with carriers of different, geographic locations. The address of each SM-DP+ server may be an internet protocol (IP) address, such as a uniform resource locator (URL) address. Each SM-DP+ server may host one or more eSIM profiles for different user devices.

The system 112 may determine the geographic location of the device 102 based on, e.g., Wi-Fi communication or geolocation such as via global positioning system (GPS) or global navigation satellite system (GNSS), among other possibilities. Based on the geographic location of the device 102, the system 112 may look up the list of known carriers to identify the carriers that provide network communication services to the device's geographic location.

In one example, whenever the device 102 arrives at a new region, the system 112 may download a list of known carriers of the new region. For instance, upon arriving in Europe from the United States, the device 102 may detect that it is visiting a new region, and then download details of carriers for Europe, including their service geographic information and their SM-DP+ server addresses. The downloaded list may then be searched to identify carriers that provide network communication services to the device's geographic location. For instance, if the device is visiting Germany, the system 112 may look up the downloaded list to identify the carriers that provide network communication services to Germany.

In one example, the device's geographic location may be generalized where location information is obtained (such as to a city, ZIP code or state level), so that a particular location of the device cannot be determined.

For each carrier that serves the device's geographic location, the system 112 may send the device ID to the SM-DP+ server associated with the carrier to inquire if the SM-DP+ server stores an eSIM profile associated with the device ID. For instance, if the device 102 is physically located in New York, the device 102 may query the SM-DP+ servers of all carriers that provide services in New York.

Upon inquiry by the device 102, each SM-DP+ server may determine if it stores any eSIM profile mapped to the device ID. If there is an eSIM profile associated with the device ID, the SM-DP+ server may send a reply to the device 102. The reply may include information indicating availability of the eSIM profile for download. The reply may also include metadata of the eSIM profile. In case the SM-DP+ server does not store any eSIM profile associated with device ID, the SM-DP+ server may return no finding to the device 102.

If an eSIM profile is found at one SM-DP+ server, the system 112 may display an indication to the user via a graphical user interface 130 that the eSIM profile is available for download. In some examples, the system 112 may display a prompt requesting the user's consent to download the eSIM profile. The device 102 may display eSIM profile metadata to the user on the graphical user interface 130.

If more than one SM-DP+ server finds an eSIM profile associated with the device ID, the system 112 may display an indication (e.g., a prompt) to the user on the graphical user interface 130 of all such eSIM profiles that are available for download. This may include providing an option in the interface 130 for the user to select one eSIM profile at a time to download. For each eSIM profile, the system 112 may display the eSIM profile metadata.

Further, for any of the methods disclosed herein, the user may control over what device information or user information is sent to any remote system such as the discovery server 150 or any SM-DP+ server, and how that information is used. By way of example, a user may be provided with controls allowing the user to make an election as to both if and when systems, programs, or features described herein may enable collection of location or other information (e.g., information about a user's preferences, or a user's current location), and if the user is sent content or communications from a server.

2. eSIM Profile Scan

The system 112 may be configured to perform several scan methods to search for an eSIM profile associated with the device 102.

2.1 First eSIM Profile Scan Method

Figure 2:
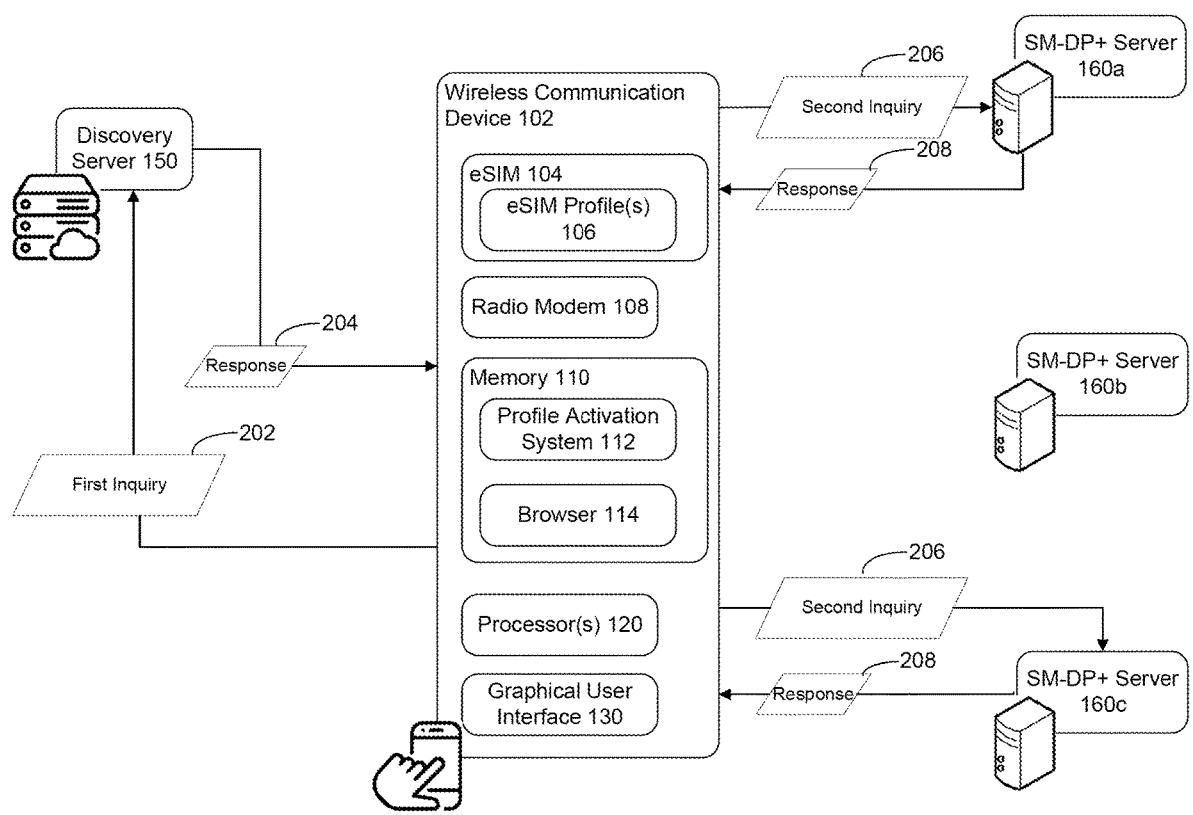
FIG. 2 illustrates a functional diagram showing interactions among a wireless communication device, a discovery server, and SM-DP+ servers in accordance with aspects of the disclosure.

Referring to FIG. 2, in a first method, the system 112 may send a first inquiry 202 to the discovery server 150 along with the device ID to determine if there is any eSIM profile associated with the device ID. The discovery server 150 may send a response 204 to the system 112 identifying one or more SM-DP+ servers that store eSIM profiles associated with the device ID, along with SM-DP+ addresses. Alternatively, the discovery server 150 may not have any eSIM profile record associated with the device ID, and return no finding to the system 112.

The system 112 may determine the geographic location of the device 102, and look up the list of known carriers to identify the carriers that provide network communication services to the device's geographic location.

For any SM-DP+ address identified in the response 204 from the discovery server 150, the system 112 may determine if it is associated with any carrier on the list of known carriers that provide network communication services to the device's geographic location. If yes, the device 102 may send a second inquiry 206 to SM-DP+ servers of each remaining carrier that serve the device's geographic location to determine if any of them stores an eSIM profile associated with the device ID. If no the device 102 may send a second inquiry 206 to SM-DP+ servers of all known carriers that serve the device's geographic location. The system 112 may receive a response 208 from each SM-DP+ server.

For example, referring to FIG. 2, assuming there are three carriers that provide network communication services to the geographic location of the device 102, the three carriers operate SM-DP+ servers 160a, 160b and 160c, respectively. In response to the first inquiry, the discovery server 150 may return an SM-DP+ server 160b address of one carrier that has an eSIM profile associated with the device ID. The system 112 may send the second inquiry to the SM-DP+ servers 160a and 160c of the remaining two carriers to determine if they have any eSIM profile associated with the device ID. If the discovery server 150 does not identify any eSIM profile associated with the device ID, the device 102 may send the second inquiry to SM-DP+ servers of all known carriers that serve the device's geographic location to determine if there is any eSIM profile associated with the device ID.

Once the system 112 receives responses 208 to the second inquiry, the system 112 may display to the user all eSIM profiles, if any, available for download, including all eSIM profiles, if any, identified by the discovery server 150 in response to the first inquiry, as well as all eSIM profiles, if any, identified in response to the second inquiry. The user may select to download one eSIM profile at a time.

2.2 Second eSIM Profile Scan Method

Figure 3:
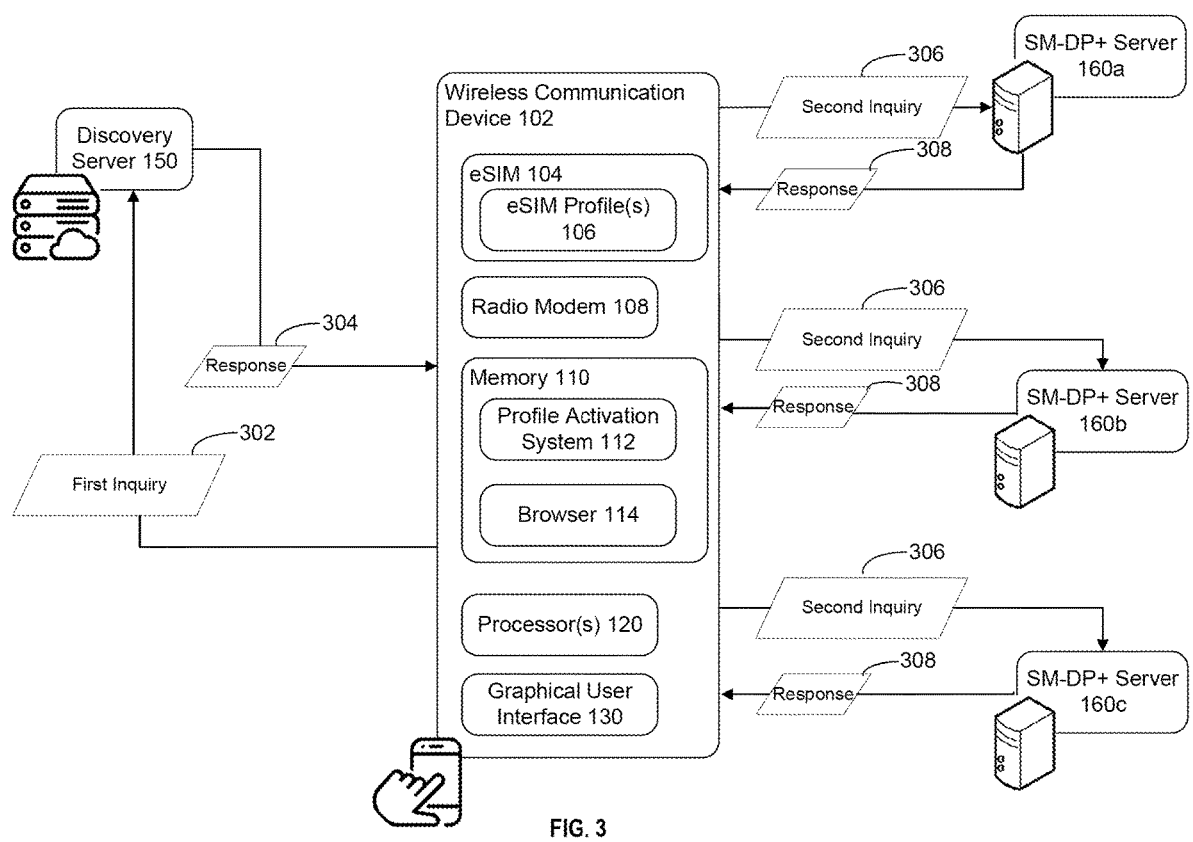
FIG. 3 illustrates another functional diagram showing interactions among a wireless communication device, a discovery server, and SM-DP+ servers in accordance with aspects of the disclosure.

FIG. 3 illustrates a second method, which is similar to the first method except that the second method queries each carrier's SM-DP+ address on a list of known carriers (e.g., a complete list of all known carriers) serving the geographic location of the device, and then checks for duplicated eSIM profiles that overlap with the response from the discovery server 150. In the second method, the system 112 may send a first inquiry 302 to the discovery server 150 along with the device ID to determine if there is any eSIM profile associated with the device ID. The discovery server 150 may send a response 304 to the system 112 identifying one or more SM-DP+ servers that store eSIM profiles associated with the device ID, along with their addresses. Alternatively, the discovery server 150 may not have any eSIM profile record associated with the device ID, and return no finding to the system 112.

The system 112 may determine the geographic location of the device 102, and look up the list of known carriers to identify the carriers that provide network communication services to the device's geographic location. For each carrier that serves the device's geographic location, the system 112 may send a second inquiry 306 to the SM-DP+ server associated with the carrier to determine if the SM-DP+ server stores an eSIM profile associated with the device ID. The system 112 may receive a response 308 from each SM-DP+ server, indicating if the SM-DP+ server stores any eSIM profile associated with the device ID.

By way of example, assuming that there are five carriers that provide network communication services to the geographic location of the device 102, in response to the first inquiry, the discovery server 150 returns SM-DP+ server addresses of two carriers that have eSIM profiles associated with the device ID. The system 112 may send the second inquiry to each SM-DP+ server of the five carriers to determine if they have any eSIM profile associated with the device ID.

If the responses 308 received from the SM-DP+ servers indicate one or more eSIM profiles associated with the device 102, the system 112 may cross check each eSIM profile identified in the response 308 against each eSIM profile identified in the response 304 from the discovery server 150 to avoid displaying duplicated eSIM profiles to the user. Thereafter, the system 112 may display to the user all eSIM profiles, if any, available for download, including the eSIM profiles, if any, identified by the discovery server 150 in response to the first inquiry, and the eSIM profiles, if any, identified by the SM-DP+ servers in response to the second inquiry. If air eSIM profile has been identified by both the discovery server 150 and any of the SM-DP+ servers, the system 112 displays a single instance of the eSIM profile to the user, so as to avoid showing duplications of the same eSIM profile. The user may select to download one eSIM profile at a time.

2.3 Third eSIM Profile Scan Method

Figure 4:
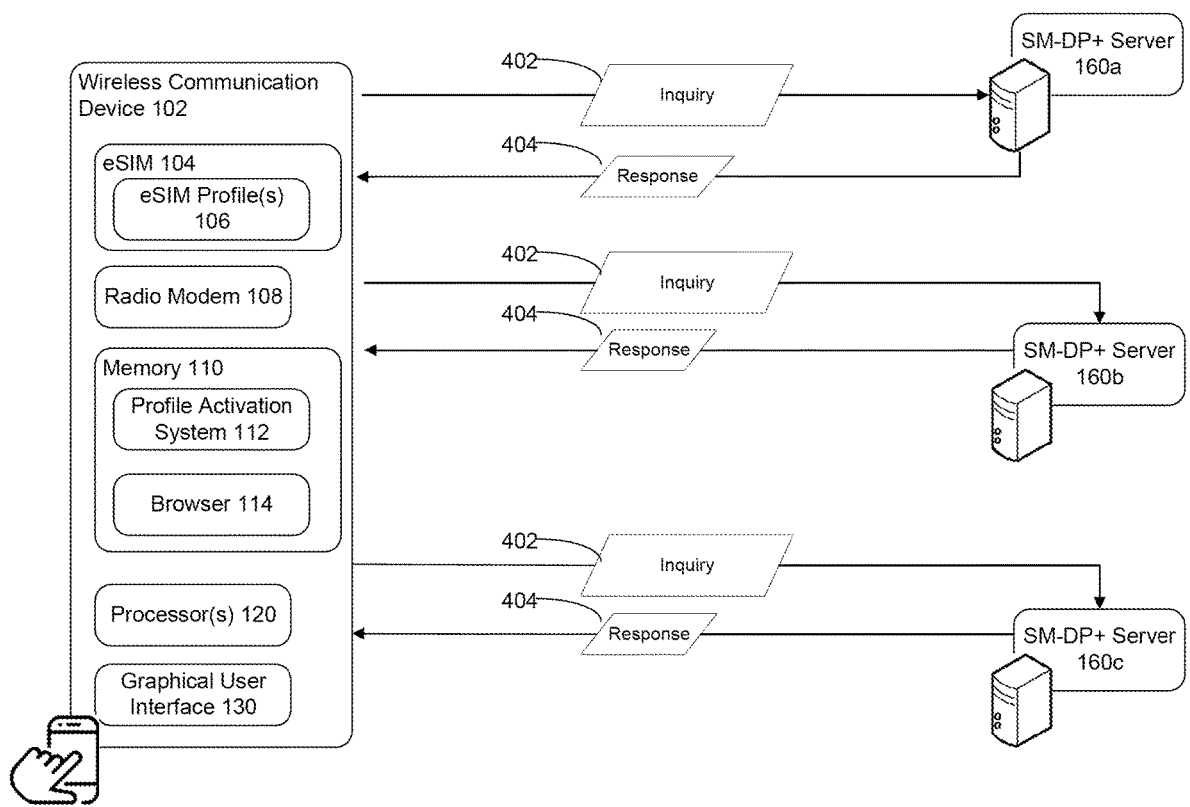
FIG. 4 illustrates a functional diagram showing interactions between a wireless communication device and SM-DP+ servers in accordance with aspects of the disclosure.

FIG. 4 illustrates a third method in which the system 112 may skip the inquiry to the discovery server 150. Instead, in this approach the system 112 may directly send inquiries 402 to SM-DP+ servers of all known carriers that provide network communication services to the geographic location of the device 102. Once the system 112 receives responses 404, the system 112 may display to the user all eSIM profiles, if any, available for download. The user may select to download one eSIM profile at a time.

2.4 Triggering Events

The system 112 may perform a scan according to any one of the scan methods identified in sections 2.1 to 2.3 upon detection of one or more triggering events. Unless otherwise indicated, the term "scan" used hereinafter may refer to any one of the scan methods identified in sections 2.1 to 2.3. The triggering events may include an event indicating that the user has actually purchased an eSIM profile from a carrier, an, event indicating that the user has likely purchased an eSIM profile from a carrier, and a system event indicating that the device 102 powers on, among other possibilities.

The event indicating that the user has purchased an eSIM profile may be detected through a web cookie which may keep a record of the user's purchase activity on a carrier's website. For example, the system 112 may detect if there is any web cookie indicating that the user could have purchased an eSIM profile. Upon such detection, the system 112 may perform a scan according to any scan method described in sections 2.1 to 2.3. Alternatively, upon such detection, the system 112 may simply contact the SM-DP+ server of the carrier as identified by the web cookie to determine if there is any eSIM profile available for download, without contacting SM-DP+ servers of all other carriers serving the geographic location of the device. For instance, if the web cookie indicates that the user purchased an eSIM profile from carrier A, the system 112 may send an inquiry to the SM-DP+ server of carrier A to determine if there is any eSIM profile available for download. In some such examples, the scan may be performed in the background such that the user is able to continue using their device while the scan method is in progress.

An example event indicating that the user has likely purchased an eSIM profile may be a reading event of the eUICC identifier or IMEI from the device's user interface, as purchase of an eSIM profile from a carrier typically requires reading of the eUICC identifier and/or IMEI. The system 112 may detect if the eUICC identifier or IMEI has been accessed from the user interface of the device. Upon such detection, the system 112 may perform a scan according to any scan method described in sections 2.1 to 2.3. In some such examples, the scan may be performed in the background such that the user is able to continue using their device while the scan method is in progress.

Another example indicating that the user has likely purchased an eSIM profile may be that the user selects an option (e.g., clicks, uses a verbal command or provides a gesture) for adding a new cellular network service on the device 102. When the system 112 detects that the user selects the option for adding a new cellular network service, the system 112 may perform a scan according to any scan method described in sections 2.1 to 2.3.

In one embodiment, every time when the device 102 powers on, the system 112 may perform a scan according to any scan method described in sections 2.1 to 2.3. Ln another embodiment, the system 112 may be configured to perform, on a periodic basis, a scan according to any scan method described in, sections 2.1 to 2.3. As will be appreciated, in these embodiments, the scan may be performed in the background such that the user is able to continue using their device while the scan method is in progress. This can avoid delays and streamline the setup process to be performed by the device.

2.5 Flow Chart of Scan Methods

Figure 5:
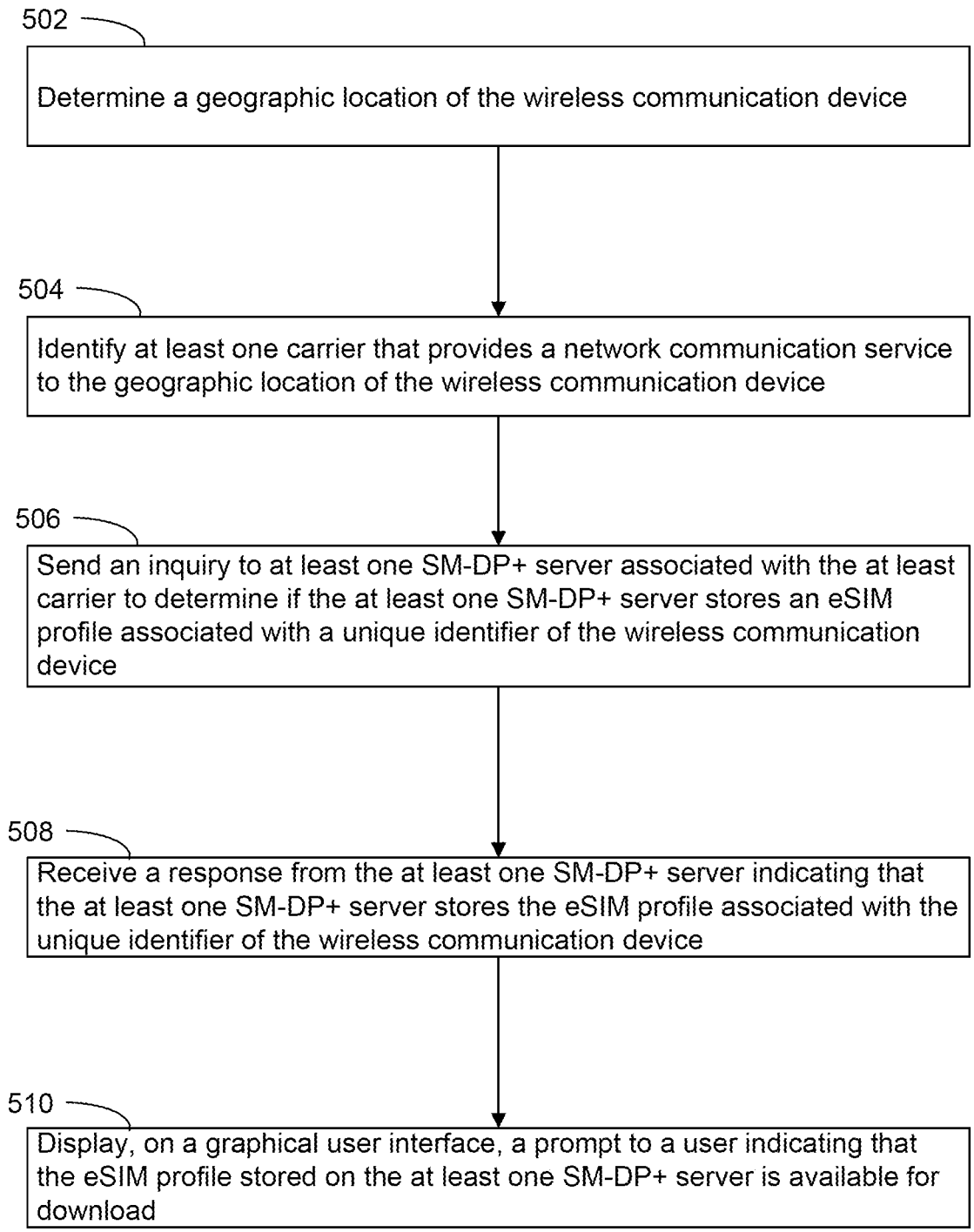
FIG. 5 illustrates a flow diagram showing an exemplary method for searching for an eSIM profile in accordance with aspects of the disclosure.

FIG. 5 presents a flow chart illustrating a scan method or a method for searching for an eSIM profile for the wireless communication device 102. At 502, one or more processors 120 may determine or estimate a geographic location of the device 102, which may be done using, e.g., geolocation information about the device, a location associated with the IP address of the device, or a location associated with a Wi-Fi access point to which the device is connected. At 504, the processor(s) 120 may identify at least one carrier that provides a network communication service to the geographic location of the device 102. At 506, the processor(s) 120 may send an inquiry to at least one SM-DP+ server associated with the at least carrier to determine if the at least one SM-DP+ server stores an eSIM profile associated with a unique identifier of the device 102. The inquiry may include the unique identifier of the device 102. The unique identifier may refer to the device ID. At 508, the processor(s) 120 may receive a response from the at least one SM-DP+ server indicating that the at least one SM-DP+ server stores the eSIM profile associated with the unique identifier of the device 102. At 510, the processor(s) 120 may display, on a graphical user interface 130, a prompt to a user indicating that the eSIM profile stored on at least one SM-DP+ server is available for download.

The processor(s) 120 may send a request to at least one SM-DP+ server to download the eSIM profile. The processor(s) 120 may receive the eSIM profile from at least one SM-DP+ server for installation on the device 102. The processor(s) 120 may install the eSIM profile into an eUICC of the device 102. The unique identifier of the device 102 may include identifiers such as an eUICC identifier or an IMEI.

The memory 110 may store a list of known carriers (e.g., a complete list of all known carriers) along with geographic information of their network communication services and their SM-DP+ server addresses. The processor(s) 120 may identify a plurality of carriers that provide a network communication service to the geographic location of the device 102. The processor(s) 120 may identify a plurality of SM-DP+ servers associated with the plurality of carriers that provide the network communication service to the geographic location of the device 102.

The processor(s) 120 may send a first inquiry to a discovery server 150 to search for any eSIM profile associated with the unique identifier of the device 102. The discovery server 150 may be configured to provide a SM-DP+ server address. The processor(s) 120 may receive, from the discovery server, a response to the first inquiry identifying at least one SM-DP+ server storing an eSIM profile associated with the unique identifier of the device 102.

The processor(s) 120 may determine that the at least one SM-DP+ server identified by the discovery server is among the plurality of SM-DP+ servers associated with the plurality of carriers. The processor(s) 120 may send a second inquiry to each remaining SM-DP+ server of the plurality of SM-DP+ servers to determine if each of them stores any eSIM profile associated with the unique identifier of the device 102. The processor(s) 120 may receive a response to the second inquiry from at least one remaining SM-DP+ server of the plurality of SM-DP+ servers indicating that it stores an eSIM profile associated with the unique identifier of the device 102. The graphical user interface 130 may display a prompt to the user indicating available eSIM profiles for download. The available eSIM profiles may include the eSIM profile stored on the at least one SM-DP+ server identified by the discovery server indicated in the response, to the first inquiry, and the eSIM profile stored on the at least one remaining SM-DP+ server indicated in the response to the second inquiry.

The processor(s) 120 may send a second inquiry to each of the plurality of SM-DP+ servers associated with the plurality of carriers to determine if each of them stores any eSIM profile associated with the unique identifier of the device 102. The processor(s) 120 may receive a response to the second inquiry from at least one SM-DP+ server of the plurality of SM-DP+ servers indicating that it stores an eSIM profile associated with the unique identifier of the device 102. The processor(s) 120 may determine whether any eSIM profile indicated in the response to the second inquiry duplicates any eSIM profile indicated in the response to the first inquiry. The graphical user interface 130 may display a prompt to the user indicating available eSIM profiles for download without duplicates.

The processor(s) 120 may send an inquiry to each of the plurality of SM-DP+ servers associated with the plurality of carriers to determine if each of them stores any eSIM profile associated with the unique identifier of the device 102. The processor(s) 120 may receive a response from at least one SM-DP+ server of the plurality of SM-DP+ servers indicating that it stores an eSIM profile associated with the unique identifier of the device 102. The graphical user interface 130 may display a prompt to the user indicating that the eSIM profile stored on the at least one SM-DP+ server is available for download.

The processor(s) 120 may receive responses from at least two SM-DP+ servers of the plurality of SM-DP+ servers indicating that each of them stores an eSIM profile associated with the unique identifier of the device 102. The graphical user interface 130 may display a prompt to the user indicating available eSIM profiles for download, the available eSIM profiles including the eSIM profiles stored on the at least two SM-DP+ servers.

The processor(s) 120 may receive a selection by the user of at least one eSIM profile from the available eSIM profiles for download. The processor(s) 120 may send a request to at least one SM-DP+ server associated with the selected at least one available eSIM profile to download the selected at least one eSIM profile. The processor(s) may receive the selected at least one eSIM profile for installation on the device 102.

The processor(s) 120 may detect an event that triggers a search for the eSIM profile. The event may include an event indicating that the user has purchased the eSIM profile, an event indicating that the user has likely purchased the eSIM profile, or an event indicating that the device 102 powers on.

3. Detection of eSIM Profile Activation

A user may purchase an eSIM profile online from a carrier's webpage via a browser 114. The carrier's webpage may display information for activating the eSIM profile in the form of an activation code string or a QR code, among other possibilities. The activation code string may include an SM-DP+ server address. The activation code string may include delimiters "$". For example, prod.smdp.rsp.goog is a known SMDP, and 1$prod.stridp.rsp.goog$abcd-efgh may be likely an activation code string, where the first character (here, "1") specifies an activation code format. Activation code strings may be formatted according to a Remote SIM Provisioning (RSP) technical specification, e.g., RSP Technical Specification version 2.2, issued Sep. 1, 2017, the entire disclosure of which is incorporated by reference herein.

A carrier may include a matching identifier (ID) in the activation code string. The carrier may not request the user to provide any device ID when purchasing the eSIM profile. Rather, the carrier may issue a matching ID which serves as a password for downloading the eSIM profile from the SM-DP+ server of the carrier. Any device with the matching ID may be eligible to download the eSIM profile.

The activation code string may include an object identifier that uniquely identifies an SM-DP+ server. In one example, there may be multiple SM-DP+ servers hidden behind a single SM-DP+ uniform resource locator (URL). Inserting the object identifier may help the SM-DP+ URL to be routed to the correct server.

Further, the activation code string may include a confirmation code required flag. The confirmation code required flag may indicate that an additional confirmation code will be requested from the user (at a later stage) before installing a profile. The confirmation code may be similar to the matching ID, i.e., it is shared by the carrier through side band channels.

In one example, the activation code string may include one or more of the following: the activation code format, SM-DP+ server address, matching identifier, object identifier, and confirmation code required flag may be delimited by the delimiter "$".

The QR code may include a string starting with leading characters "lpa://" which stand for local profile assistant, followed by the activation code string. For example, the leading characters "lpa://" may be followed by one or more of the following: the activation code format, SM-DP+ server address, matching identifier, object identifier, and confirmation code required flag that ale delimited by the delimiter "$". lpa://1$SMDP.GSMA.COM$04386-AGYFT-A74Y8-3F815$1.3.6.1.4.1.31746$1 is an example QR code, that starts with "lpa://". In this example, the first 1 specifies an activation code format. SMDP.GSMA.COM is the SM-DP+ address. 04386-AGYFT-A74Y8-3F815 is the matching ID. 1.3.6.1.4.1.31746 is the Object identifier. The last 1 is the confirmation code required flag.

The system 112 may be configured to automatically detect in a carrier's webpage a string exhibiting a predefined pattern that is suggestive of an activation code string. The predefined pattern may include one or more of the following: leading characters "lpa://", an SM-DP+ server address, a matching identifier, delimiters "4", an object identifier of an SM-DP+ server, a confirmation code required flag, or other optional fields in the activation code string.

Figure 6:
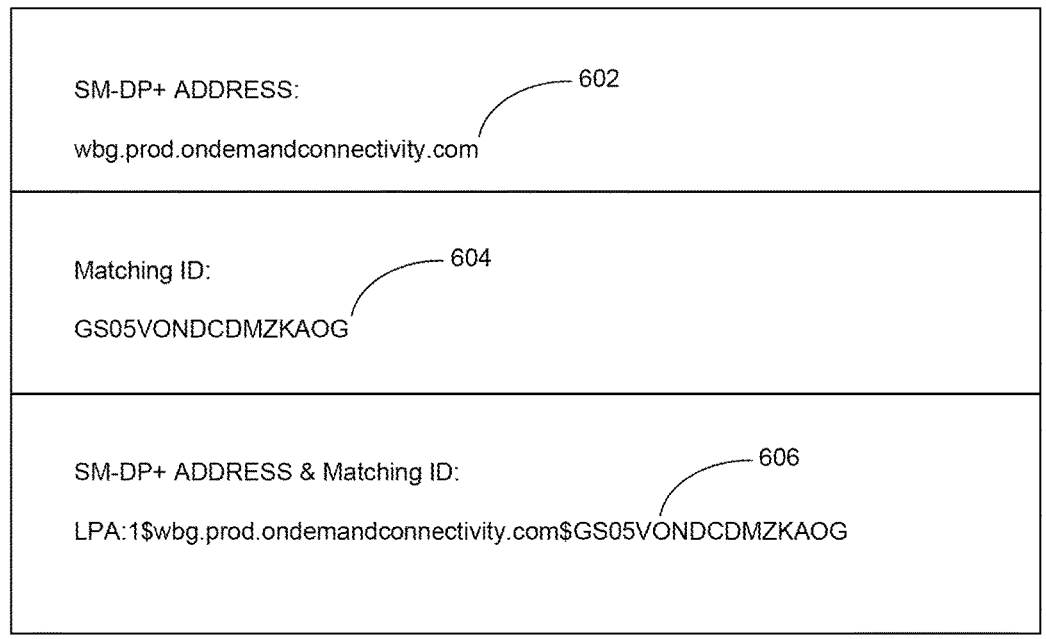
FIG. 6 is a schematic illustration of a carrier's webpage showing information to activate an eSIM profile in accordance with aspects of the disclosure.

FIG. 6 illustrates an example webpage 600 associated with a carrier, displaying information for downloading the SIM profile from the carrier. As shown in FIG. 6, the webpage 600 displays an address 602 of an SM-DP+ server associated with the carrier, a matching ID 604, and a string 606 for downloading the eSIM profile from the SM-DP+ server. The string 606 starts with "LPA" and includes an example SM-DP+ server address "wbg.prod.ondemandconnectivity.com" as well as an example matching ID "GS05VONDCDMZKAOG".

The string 606 may be encrypted and displayed on the carrier's website in the form of a two-dimensional barcode, such as a QR code. The eSIM profile may be downloaded onto any device, so long as the activation code string (e.g., consisting of at least the SM-DP+ address and a matching ID) is provided to the device's eSIM application, or the QR code that encrypts the above information is scanned by the device's eSIM application. Once the eSIM profile is downloaded onto the device, the carrier may gather the device ID of the device 102, and keep a record thereof. The system 112 may be configured to automatically detect, in a carrier's webpage, any string exhibiting the above-mentioned predefined pattern or any QR code that encrypts such a string.

In one example, once the system 112 detects a webpage containing a string with the predefined pattern or a QR code encrypting such a string, the system 112 may embed a selectable (e.g., clickable) link into the string or the QR code. For example, as illustrated in FIG. 7, instead of displaying the webpage 600, the browser 114 may display a webpage 700, changing the display format of the string 606 from plain text to a selectable link 706. The link 706 upon selection may trigger a sequence of automatic steps including launching the eSIM application on the device 102 to download the eSIM profile from the carrier's SM-DP+ server. Such automation may reduce the amount of user-device interaction. For instance, it, may avoid, the need for user-device interaction associated with opening the eSIM application, scanning the QR code or entering the activation code string into the eSIM application. This approach moves the burden of triggering the eSIM application from the carrier web portal to the system 112.

In another example, once the system 112 detects a webpage containing a string with the predefined pattern or a QR code encrypting such a string, the browser 114 may display the webpage as is. The system 112 may automatically perform a sequence of automatic steps, including retrieving eSIM profile metadata from the carrier's SM-DP+ server using the activation code string, displaying the retrieved eSIM profile metadata to the user_ and requesting the user's consent to download the eSIM profile.

3.1 Flow Chart of Detection Methods

Figure 8:
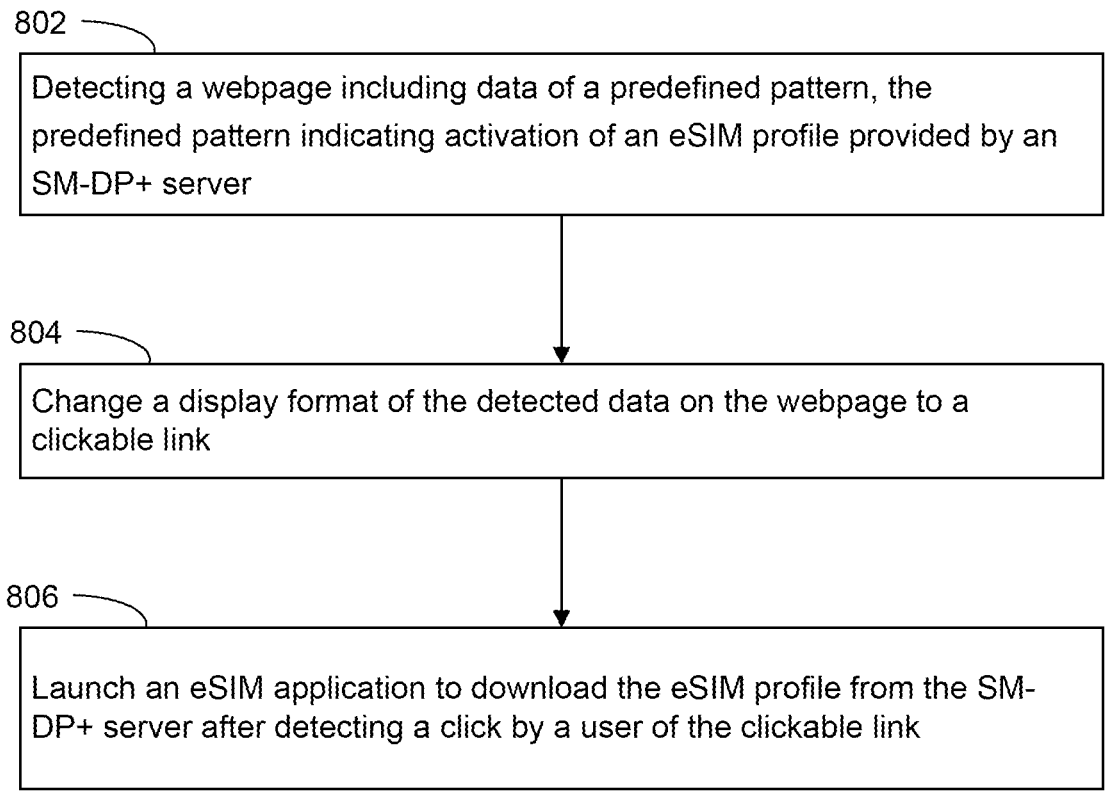
FIG. 8 illustrates a flow diagram showing a method for detecting activation information of an eSIM profile in accordance with aspects of the disclosure.

FIG. 8 presents a flow chart illustrating a method for detecting activation information of an eSIM profile. At 802, the processor(s) 120 may detect a webpage including data of a predefined pattern. The predefined pattern may indicate the activation code string of an eSIM profile provided by an SM-DP+ server. At 804, the processor(s) 120 may change a display format of the detected data on the webpage to a selectable link. At 806, the processor(s) 120 may launch an eSIM application to download the eSIM profile from the SM-DP server after detecting a selection by a user of the selectable link. In one example, the data of the predefined pattern may include a string of the predefined pattern or a QR code encoding the string of the predefined pattern. The predefined pattern may include one or more of the following: leading characters of "lpa://", an SM-DP+ server address, a matching ID, delimiters "$", an object identifier of an SM-DP+ server, a confirmation code required flag, or other optional fields in the activation code string.

Figure 9:
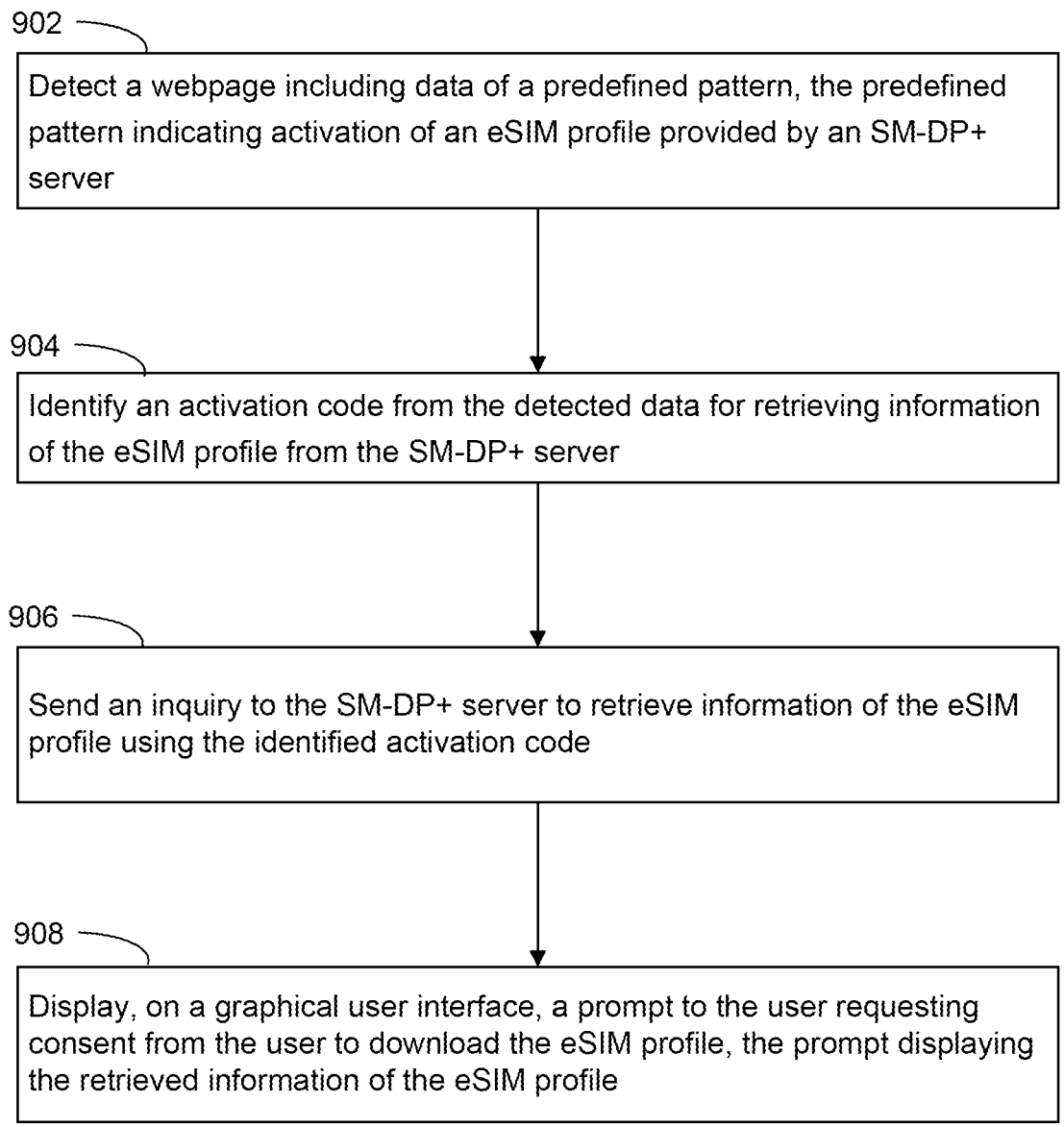
FIG. 9 illustrates a flow diagram showing another method for detecting activation information of an eSIM profile in accordance with aspects of the disclosure.

FIG. 9 presents a flow chart illustrating another method for detecting activation information of an eSIM profile. At 902, the processor(s) 120 may detect a webpage including data of a predefined pattern. The predefined pattern may indicate activation of an eSIM profile provided by an SM-DP+ server. The detected data may include an activation code string for retrieving information of the eSIM; profile from the SM-DP+ server. At 904, the processor(s) 120 may identify the activation code string from the detected data. At 906, the processor(s) 120 may send an inquiry to the SM-DP+ server to retrieve information of the eSIM profile using the identified activation code string. At 908, the graphical user interface 130 may display a prompt to the user requesting consent from the user to download the eSIM profile, the prompt displaying the retrieved information of the eSIM profile. In one example, the data of the predefined pattern may include a string of the predefined pattern or a quick response (OR) code encrypting the string of the predefined pattern. The predefined pattern may include one or more of the following: leading characters of "LPA", an SM-DP+ server address, a matching ID, delimiters "$", an object identifier of an SM-DP+ server, a confirmation code required flag, or other optional fields in the activation code string.

4. Example System Components

The memory 110 may be databases that store information accessible by the processor(s) 120, including, but not limited to: instructions and data (e.g., the profile activation system 112) that may be executed or otherwise used by the processor(s). The memory may be of any type capable of storing information accessible by the processor(s), including a computing device-readable medium. The memory may be a non-transitory computer readable medium such as a hard-drive, memory card, optical disk, solid-state, etc. The non-transitory computer-readable medium may include computer-readable instructions that when executed by the processor(s) 120, cause the processor(s) 120 to perform any method disclosed above. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processor(s) 120 may be any conventional processors, such as commercially available GPUs, CPUs, TPUs, etc. Alternatively, each processor may be a dedicated device such as an ASIC or other hardware-based processor. Although FIG. 1 functionally illustrates the processors, memory as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system. Accordingly, references to a processor or computing device will be understood to include references to a collection of processors or computing devices or memories that may or may not operate in parallel. The processor(s) 120 may access the memory 110 via one or more networks.

The wireless communication device 102 may include a computing system and/or a desktop computer. The device 102 may include one or more components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users. Example wireless devices include, but not limited to, a mobile phone, a laptop, a smart home device such as a smart display or a speaker, among other possibilities. Each wireless device may be mobile or stationary. The device 102 may be a mobile phone, a cell phone, a smart phone, a personal digital assistant, a wearable computer, a headset computer, a laptop computer, a notebook computer, or a tablet computer.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
identifying, by one or more processors of a wireless communication device, a geographic location associated with the device;
identifying, by the one or more processors, at least one carrier that provides a wireless network communication service to the geographic location of the device;
sending an inquiry, by the one or more processors, to at least one subscription server associated with the at least one carrier to determine if the at least one subscription server stores an electronic identity module (eSIM) profile associated with a unique identifier of the device, the inquiry including the unique identifier of the device;
receiving a response, at the one or more processors, from the at least one subscription server indicating that the at least one subscription server stores the eSIM profile associated with the unique identifier of the device; and
generating for display, on a graphical user interface associated with the device, a prompt to a user indicating that the eSIM profile stored on the at least one subscription server is available for download.

2. The method of claim 1, further comprising:
sending a request to the at least one subscription server to download the eSIM profile; and receiving the eSIM profile from the at least one subscription server for installation on the device.

3. The method of claim 2, further comprising:
installing the eSIM profile into an embedded universal integrated circuit card of the device.

4. The method of claim 1, wherein the unique identifier of the device includes at least one of an embedded universal integrated circuit card identifier or an international mobile equipment identity.

5. The method of claim 1, further comprising:
storing a list of known carriers along with geographic information of their network communication services and their subscription server addresses;
identifying, by the one or more processors, a plurality of carriers in the list that provide a network communication service to the geographic location of the device; and
identifying a plurality of subscription servers associated with the plurality of carriers that provide the network communication service to the geographic location of the device.

6. The method of claim 5, further comprising:
sending a first inquiry to a discovery server to search for any eSIM profile associated with the unique identifier of the device, the discovery server configured to provide a switched multimegabit data service; and
receiving, from the discovery server, a response to the first inquiry identifying at least one subscription server storing an eSIM profile associated with the unique identifier of the device.

7. The method of claim 6, further comprising:
determining that the at least one subscription server identified by the discovery server is among the plurality of subscription servers associated with the plurality of carriers;
sending a second inquiry to each remaining subscription server of the plurality of subscription servers to determine if each of them stores any eSIM profile associated with the unique identifier of the device;
receiving a response to the second inquiry from at least one remaining subscription server of the plurality of subscription servers indicating that it stores an eSIM profile associated with the unique identifier of the device; and
generating for display, on the graphical user interface, a prompt to the user indicating available eSIM profiles for download, the available eSIM profiles including:
the eSIM profile stored on the at least one subscription server identified by the discovery server indicated in the response to the first inquiry, and
the eSIM profile stored on the at least one remaining subscription server indicated in the response to the second inquiry.

8. The method of claim 6, further comprising:
sending a second inquiry to each of the plurality of subscription servers associated with the plurality of carriers to determine if each of them stores any eSIM profile associated with the unique identifier of the device;
receiving a response to the second inquiry from at least one subscription server of the plurality of subscription servers indicating that it stores an eSIM profile associated with the unique identifier of the device;
determining whether any eSIM profile indicated in the response to the second inquiry duplicates any eSIM profile indicated in the response to the first inquiry; and generating for display, on the graphical user interface, a prompt to the user indicating available eSIM profiles for download without duplicates.

9. The method of claim 5, further comprising:
sending an inquiry to each of the plurality of subscription servers associated with the plurality of carriers to determine if each of them stores any eSIM profile associated with the unique identifier of the device;
receiving a response from at least one subscription server of the plurality of subscription servers indicating that it stores an eSIM profile associated with the unique identifier of the device; and
generating for display, on the graphical user interface, a prompt to the user indicating that the eSIM profile stored on the at least one subscription server is available for download.

10. The method of claim 9, further comprising:
receiving responses from at least two subscription servers of the plurality of subscription servers indicating that each of them stores an eSIM profile associated with the unique identifier of the device; and
generating for display, on the graphical user interface, a prompt to the user indicating available eSIM profiles for download, the available eSIM profiles including the eSIM profiles stored on the at least two subscription servers.

11. The method of claim 10, further comprising:
receiving a selection of at least one eSIM profile from the available eSIM profiles for download;
sending a request to at least one subscription server associated with the selected at least one available eSIM profile to download the selected at least one eSIM profile; and
receiving the selected at least one eSIM profile for installation on the device.

12. The method of claim 1, further comprising:
detecting, by the one or more processors, an event that triggers a search for the eSIM profile.

13. The method of claim 12, wherein the event includes:
an event indicating that the user has actually purchased the eSIM profile;
an event indicating that the user has likely purchased the eSIM profile; or
an event indicating that the device powers on.

14. A system comprising:
memory configured to store a plurality of subscription server addresses associated with a plurality of carriers that provide wireless network communication services to a plurality of geographic locations; and
one or more processors of a wireless communication device configured to:
identify a geographic location associated with the device;
identify at least one carrier that provides a network communication service to the geographic location of the device;
send an inquiry to at least one subscription server associated with the at least one carrier to determine if the at least one subscription server stores an eSIM profile associated with a unique identifier of the device, the inquiry including the unique identifier of the device;
receive a response from the at least one subscription server indicating that the at least one subscription server stores the eSIM profile associated with the unique identifier of the device; and generate for display, on a graphical user interface, a prompt to a user indicating that the eSIM profile stored on the at least one subscription server is available for download.

15. A method for detecting activation information of an embedded subscriber identity module (eSIM) profile, the method comprising:
    detecting, by one or more processors of a wireless computing device, a webpage including data of a predefined pattern, the predefined pattern being associated with an activation code string of an eSIM profile provided by a subscription server;
    changing, by the one or more processors, a display format of the detected data on the webpage to a selectable link; and
    launching, by the one or more processors an eSIM application to download the eSIM profile from the subscription server after detecting selection of the selectable link.

16. The method of claim 15, wherein the data of the predefined pattern includes a string of the predefined pattern or a quick response code encoding information of the predefined pattern.

17. The method of claim 15, wherein the predefined pattern includes one or more of the following: a predefined set of leading characters, a subscription server address, a matching identifier, one or more delimiters, an object identifier of a subscription server, or a confirmation code required flag.

18. A method for detecting activation information of an embedded subscriber identity module (eSIM) profile, the method comprising:
    detecting, by one or more processors of a wireless computing device, a webpage including data of a predefined pattern, the predefined pattern indicating activation of an eSIM profile provided by a subscription server, the detected data being associated with an activation code string for retrieving information of the eSIM profile from the subscription server;
    identifying the activation code string from the detected data;
    sending an inquiry to the subscription server to retrieve information of the eSIM profile using the identified activation code string; and
    generating for display, on a graphical user interface associated with the wireless computing device, a prompt to the user requesting consent from the user to download the eSIM profile, the prompt displaying the retrieved information of the eSIM profile.

19. The method of claim 18, wherein the data of the predefined pattern includes a string of the predefined pattern or a quick response code encoding information of the predefined pattern.

20. The method of claim 18, wherein the predefined pattern includes one or more of the following: a predefined set of leading characters, a subscription server address, a matching identifier, one or more delimiters, an object identifier of a subscription server, or a confirmation code required flag.

21. A processing system for detecting activation information of an embedded subscriber identity module (eSIM) profile, the processing system comprising one or more processors configured to:
    detect a webpage includes data of a predefined pattern, the predefined pattern indicating activation of an eSIM profile provided by a subscription server;
    change a display format of the detected data on the webpage to a selectable link; and
    launch an eSIM application to download the eSIM profile from the subscription server after detecting a selection by a user of the selectable link.

22. A processing system for detecting activation information of an embedded subscriber identity module (eSIM) profile, the processing system comprising one or more processors configured to:
    detect a webpage includes data of a predefined pattern, the predefined pattern indicating activation of an eSIM profile provided by a subscription server, the detected data being associated with an activation code string for retrieving information of the eSIM profile from the subscription server;
    identify the activation code string from the detected data;
    send an inquiry to the subscription server to retrieve information of the eSIM profile using the identified activation code string; and
    generate for display, on a graphical user interface, a prompt to the user requesting consent from the user to download the eSIM profile, the prompt displaying the retrieved information of the eSIM profile.

* * * * *